United States Patent [19]

Power

[11] 4,335,737
[45] Jun. 22, 1982

[54] PROPORTIONING AND MIXING IMMISCIBLE LIQUIDS

[76] Inventor: Harold H. Power, 65 Five Field Rd., Madison, Conn. 06443

[21] Appl. No.: 216,770

[22] Filed: Dec. 15, 1980

[51] Int. Cl.³ ............................................. G05D 11/13
[52] U.S. Cl. ................................. 137/98; 137/101.21; 123/25 E; 251/122
[58] Field of Search ............ 137/10, 3, 98, 100, 137/101.21; 123/25 E; 251/122, 61.4

[56] References Cited

U.S. PATENT DOCUMENTS

| | | | |
|---|---|---|---|
| 2,337,851 | 12/1943 | Junkins | 196/132 |
| 2,592,304 | 4/1952 | Lubeley | 137/100 |
| 3,023,764 | 3/1962 | Dooley et al. | 137/98 |
| 3,152,607 | 10/1964 | Lundeen | 251/122 |
| 3,636,978 | 1/1972 | Byers . | |
| 3,647,002 | 3/1972 | Lindsay | 169/16 |
| 3,770,198 | 11/1973 | Mihara | 137/100 |
| 3,818,876 | 6/1974 | Voogd | 123/25 E |
| 3,865,126 | 2/1975 | Baggaley | 137/101.21 |
| 4,073,272 | 1/1978 | Burgess | 251/61.4 |

OTHER PUBLICATIONS

"Emulsions as Fuels", Dooher et al., *Mechanical Engineering*, Nov. 1976, pp. 36–41.

"Looking to Cut Fuel Bills", *Combustion*, Dec. 1976, p. 21.

*Primary Examiner*—H. Jay Spiegel
*Attorney, Agent, or Firm*—C. G. Nessler

[57] ABSTRACT

Disclosed is apparatus for dispersing water within a flowing stream of fuel oil, to produce an oil and water emulsion which improves combustion efficiency by as much as 15 percent. The apparatus includes a pressurized supply of water, a differential pressure regulator, a proportioning or tracking valve, and an emulsifying mixer. The differential pressure regulator provides water to the tracking valve at a pressure which is a constant amount above that of the oil just upstream of the mixing point. The tracking valve has two chambers. A first chamber receives oil and contains a float which moves in response to oil flow therethrough; a float extension penetrates from the first chamber into the second chamber which receives the water, and causes movement of a needle shaped element therein, to vary the water flow path area. The operative valve elements are coaligned and configured especially for responsiveness and accuracy in proportioning. The apparatus further includes a control and valving system which prevents operation of the water injection components when the oil flow is inadequate. Also prevented is inadvertant passage of oil into the water processing components.

8 Claims, 4 Drawing Figures

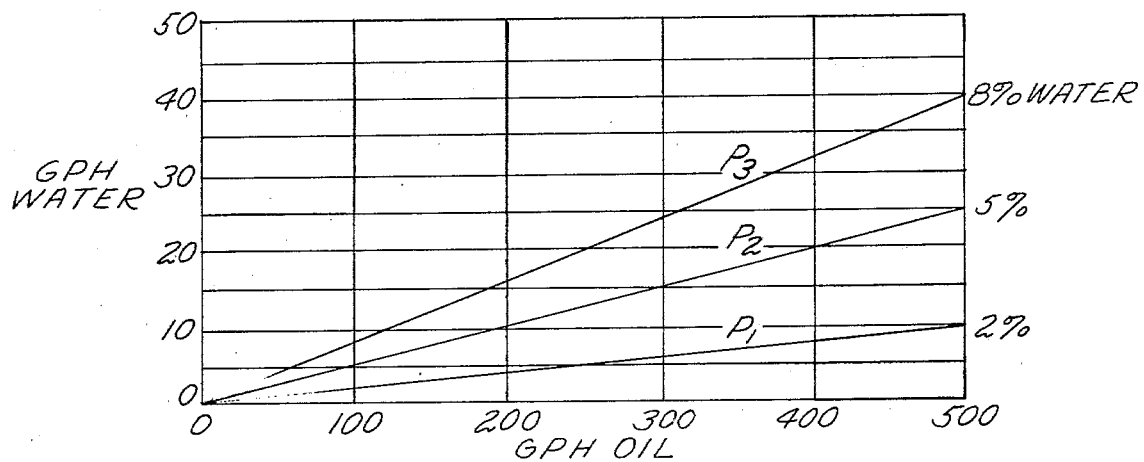

PROPORTIONING AND MIXING IMMISCIBLE LIQUIDS

BACKGROUND OF THE INVENTION

1. The invention relates to the controlled mixing of one fluid stream with another fluid stream particularly to the dispersion of small quantities of water in fuel oil streams to enhance efficiency in combustion.

2. It is found that by introducing small quantities of water into fuel oil, such as API grades No. 2, 4 and 6, the combustion of atomized streams of the oils is enhanced. Increases in combustion efficiency are obtained. Fuel oil and water are not miscible as is well known, and to produce the desired effect the water droplets must be uniformly and finely dispersed within the fuel oil stream. It is a problem to accomplish this, especially since in most large combustion systems the fuel oil stream and water stream parameters may vary significantly with time.

Generally, the approach which has been taken is a semibatch method which necessitates a storage reservoir. Oil at a constant pressure and at a flow rate which exceeds the maximum firing rate of the combustor is pumped into a reservoir. Under these constant conditions water is relatively easily and uniformly injected. Withdrawal from the reservoir of the oil-water mixture is accomplished by a separate pumping system, with the flow rate varying with time according to the desired firing rate of the combustor. The oil and water flowing into the reservoir are alternately turned full on or full off as the minimum and maximum levels in the reservoir dictate.

Of course many devices for mixing liquids in general and immiscible liquids in particular are known in the chemical process industry. However, much of such equipment is ill-suited for installation in the field environments where large industrial and marine combustion systems are found. For such applications the apparatus must be relatively compact, require modest power, be easily installed, reliable and easy to operate. Furthermore, many of the prior art systems simply proportion or meter a first liquid based on the pressure or flow of a second liquid. However, in combustion systems changes in both flow rate and pressure over a fairly wide range must be accomodated.

Of significance in the prior art, Junkins U.S. Pat. No. 2,337,851 discloses a proportioning system usable in the generation of steam. A flow of water through a first chamber in a valve mechanically activates an element, which through a linkage proportions the flow of water vapor in a second chamber. Lindsay in U.S. Pat. No. 3,647,002 discloses a demand proportioning valve for introducing relatively small quantities of an additive into a water stream for fire fighting equipment. The movement of a spring biased element within the main water stream mechanically changes the position of a like element located in the second stream.

Neither of these devices is entirely suited in performance and simplicity for use on fuel oil and water mixing. The stability of combustion and the efficiency benefits of water inclusion are dependent on uniformity of the product being atomized in the combustor. Small perturbations in streamline proportions which might be acceptable in other installations cannot be tolerated. Further there are safety aspects not present in many other situations. Under all operating and non-operations conditions, the flow of fuel oil into the water system must be prevented, to avoid contamination and fouling of the water system. Likewise, introduction of water into the fuel oil system must be prevented, particularly where there is no fuel oil flow. Accordingly, there is a need for an improved apparatus for mixing water with fuel oil and other like ingredients.

SUMMARY OF THE INVENTION

An object of the invention is to introduce water into a flowing oil stream in a constant and precise proportion, regardless of variations in flow and pressure in the oil stream. A further object is to provide an apparatus for introducing water into oil for combustion systems, so that there is safe and reliable operation under all conditions.

The invention is usable for liquids other than oil and water, but is most easily described in terms of their mixture. According to the invention the apparatus is comprised of a supply of water, a pressure modulator, a proportioning valve (called a "tracking valve" herein), and a mixer in the oil line. The water is first supplied at a pressure greater than any expected pressure in the oil line. It is then fed to a device, such as a differential pressure, regulator where it is modulated to provide a water stream at a pressure which is a constant amount greater than the pressure of the oil just before the point at which the water and oil are mixed. The water is next passed to the tracking valve which contains two chambers: the first chamber has oil passing therethrough, which moves a float and varies the flow path area therein. The float movement mechanically causes the same sense of variation in flow path area in the second chamber, through which the water passes. Water passing through the valve in amount determined by the flow path is conveyed to the mixer in the oil line. Preferrably the mixer is of the orfice type and forms a fine dispersion of water, thereby creating an emulsion. Thereafter the water and oil emulsion is conveyed to the combustor for use.

A control system is used in the preferred practice of the invention to provide safe operation. The control system also automatically activates the introduction of water when there is flow in the oil line above a minimum level. But, the introduction of water into the oil stream is prevented at non-zero low flow rates, outside the normal 10:1 flow range typical of combustor operation, as the oil and water emulsification may not be properly accomplished. Under such circumstance, and when there is zero oil flow, the water processing components are isolated by valves to prevent introduction of oil and possible fouling.

The tracking valve is of unique construction. The two chambers lie on the axis along which the float travels. An extension connected to the float penetrates from the first chamber into the second chamber, and moves an element therein to vary the flow path area which is defined by the element and a seat. In the preferred configuration, the element is a freely movable needle which is supported at one end by its contact with the float extension and at the other end by a shoulder which slides within the seat. The seat is axially movable to allow change in the flow path for any given needle axial position. The relationships between the flow path areas in the first and second chambers is determined by the shape of the first chamber and the shape of the needle in the second chamber. Of course other mechanical shapes which provide varying flow paths will present themselves for use within the scope of the invention.

Biasing springs thrust the float and the needle toward their closed positions to ensure proper operation in the preferred configuration. Desirably, the flow in the second chamber is ported in a manner which tends to bias the needle toward its closed position as well. A feature of the invention is that under conditions of high apparent flow, such as if the float moves greatly should a biasing spring fail, the float extension will contact the seat and thereby shut off water flow through the second chamber, thus avoiding improperly high proportions of water in the oil which would otherwise result.

In a preferred configuration, the valve is constructed of a multiplicity of circular segments which are held in sealed contact. This facilities disassembly, cleaning and replacement of parts. The seal around the float extension is best made in a special design, to allow easy movement of the float extension in normal operation, but at the same time enables sealing of high differential pressures as may occur when there is not water supplied to the valve. In the invention, this is preferrably accomplished by providing an o-ring in a groove which is diametrically and axially greater than the o-ring dimensions.

The invention is made of relatively simple components, yet is uniquely effective in providing a uniform mixture of water and oil in a variety of installations. It has been found effective where the pressure is from 20 to 200 psi (0.14–14 kPa) and where the flow ranges up to 500 gallons per hour.

Other aspects and features of the invention will be evident from the Figures and Description of the Preferred Embodiment which follow.

BRIEF DESCRIPTION OF THE DRAWINGS

FIG. 4 shows some of the proportions of water and oil producible by the invention.

DESCRIPTION OF THE PREFERRED EMBODIMENT

The preferred embodiment of the invention is described in terms of the introduction of small quantities of water into a fuel oil stream. However, it will be apparent that the invention may be used for mixing miscible and immiscible fluids.

The introduction of finely dispersed water droplets into a fuel oil stream, such as API 2, 4 or 6 oils, is found to result in enhanced efficiency in industrial combustion systems. A dispersion of water in the range of 3 to 10 volume percent can result in increases in overall combustion for energy efficiency up to about 15%. To accomplish this, the water must be continuously introduced into the fuel oil stream with a droplet size of the order of seven microns in an exact proportion which depends on the particular installation and fuel. Once chosen, the proportions of water must be maintained; the quantity changing with changes in fuel oil flow.

Figure 1:
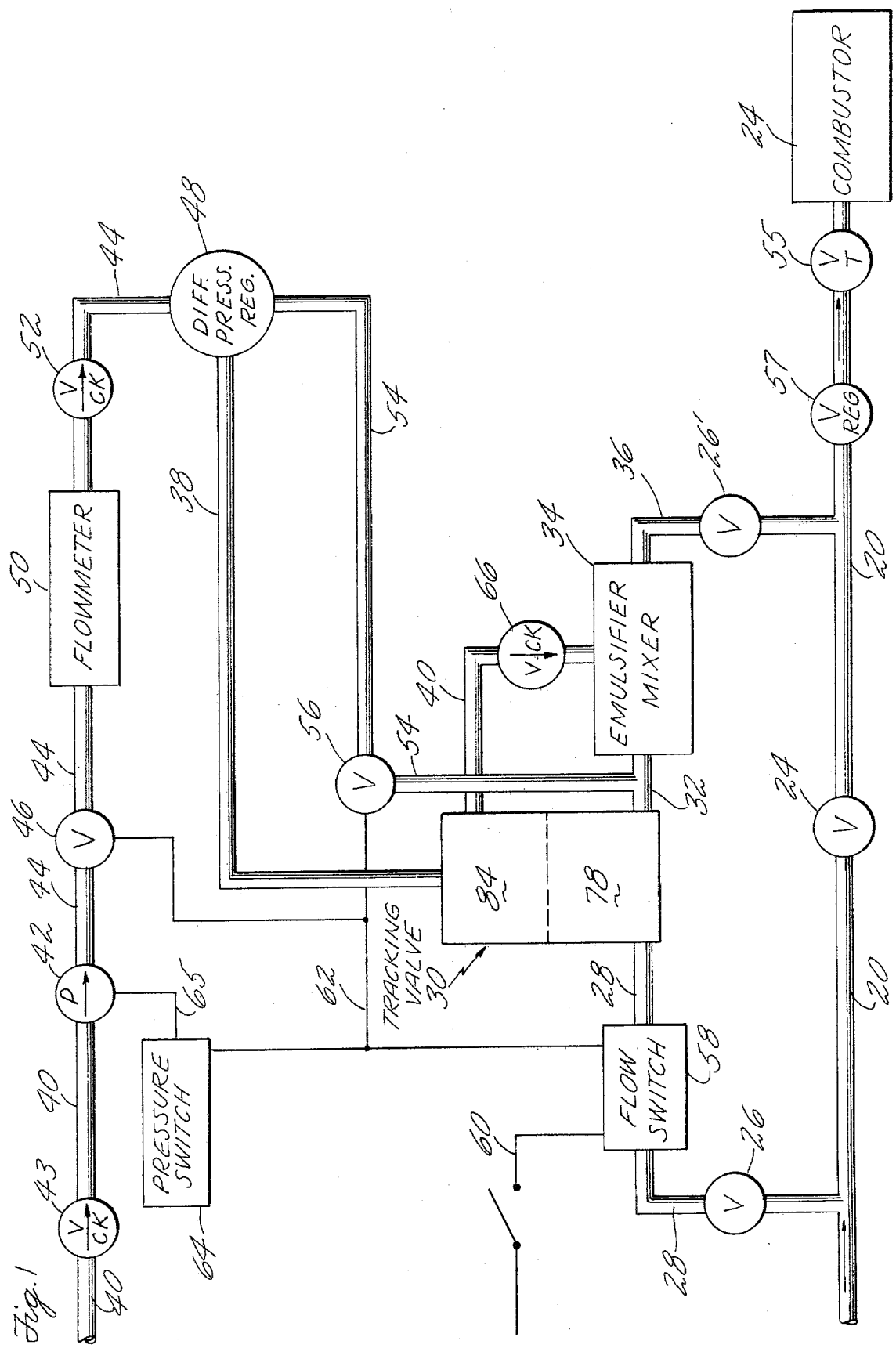
FIG. 1 is a schematic diagram of the overall apparatus for mixing oil and water.
Figure 2:
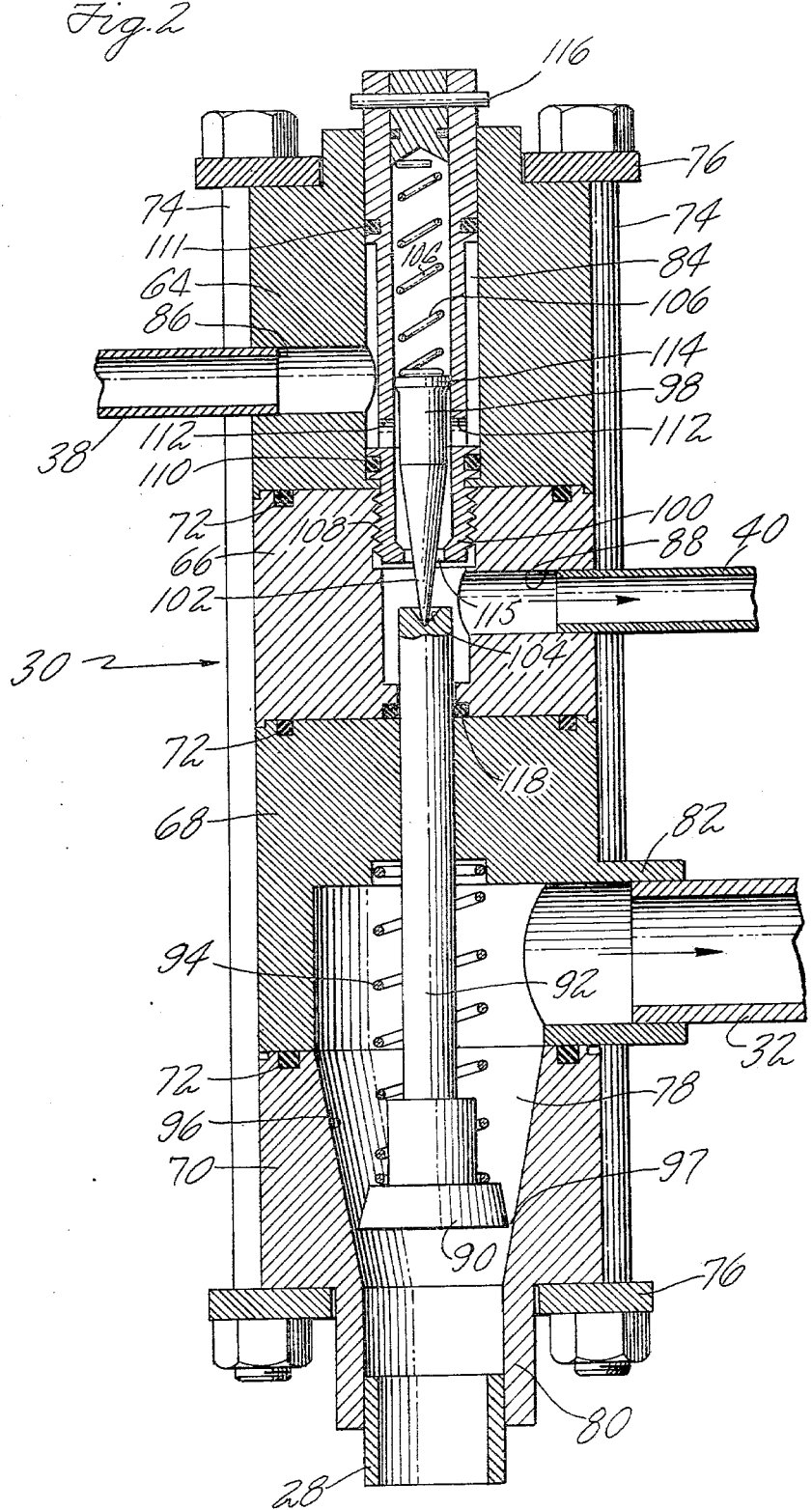
FIG. 2 is a cross section of the valve for proportioning water according to oil flow.
Figure 3:
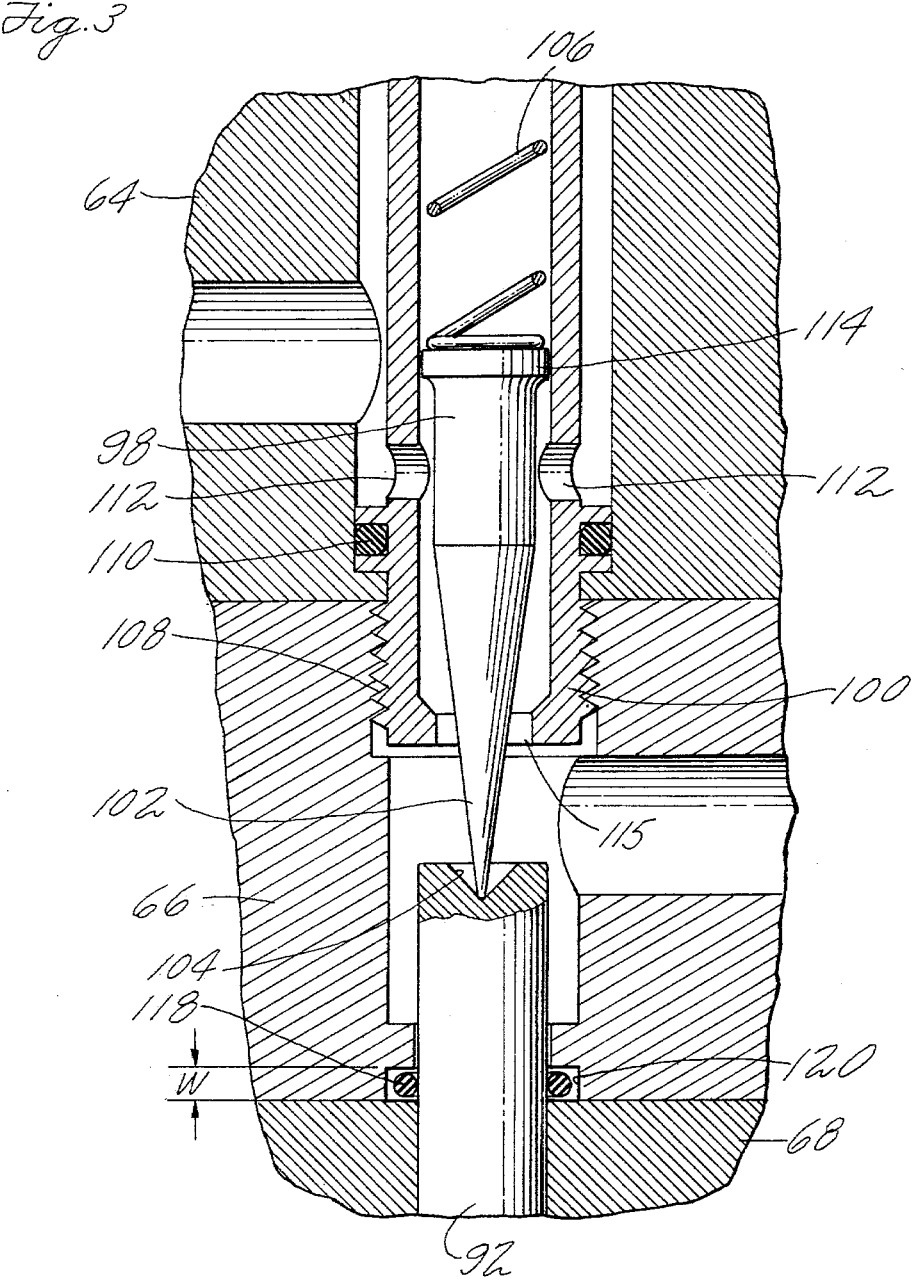
FIG. 3 is a more detail view of a portion of the valve of FIG. 2, slightly changed in position.

FIG. 1 schematically illustrates the overall apparatus of the invention. Fuel oil flows through a pipeline 20 to a combustor 22. Operation of valves 24, 26, 26' is used to divert fuel oil through the inventive proportioning and mixing apparatus when its use is desired. When so diverted, fuel oil may flow via line 28 through a flow switch 58 to a novel valve 30, called hereafter the tracking valve, the workings of which are illustrated in FIGS. 2 and 3 and described in more detail below. Briefly, the tracking valve proportions the water flow path area in a second chamber 84 according to the fuel oil flow through a first chamber 78. The valve works in combination with a differential pressure regulator to exactly proportion the water to the fuel. The tracking valve first chamber is connected by line 32 to an emulsifier mixer 34 where water is introduced into the oil. Line 36 connects the emulsifier via valve 26' back to the combustor feed line 20. The other elements shown in the Figure are utilized to precisely control the introduction of water. The tracking valve 30 is a key element in proportioning the water. Inlet line 38 feeds water to the second chamber of the tracking valve; exit line 40 carries the metered water to the emulsifier which mixes it into the oil stream as a finely divided dispersion.

Referring further to FIG. 1, water is introduced into the system by a source line 40. A check valve 43, also known as a back flow preventor, lies in the line 40 to prevent any contamination of the water source by back flow of oil should there be a gross malfunction of the system. The line 40 connects to a pump 42 which increases the pressure of the water to a level higher than will be experienced in the oil line under any operating condition. The pump discharges water by means of line 44, through an electrically operated valve 46, a flow meter 50 and check valve 52, to a differential pressure regulator 48. The pressure of the water is modulated by the regulator 48 and discharged by line 38 to the tracking valve 30. The flow meter 50 is for monitoring flow, and the check valve 52 has the purpose of preventing reverse flow in lines 44 and 38. The differential pressure regulator 48 modulates the pressure of the discharged water in line 38 according to the fuel oil pressure. Line 54 communicates the fuel oil pressure in the tracking valve discharge line 32 to the regulator; electrically operated valve 56 is placed in the line 54. A flow switch 58 is sensitive to flow in the fuel oil line 28. This switch functions to activate the electrically powered elements in the system by electric lines 62 when there is sufficient oil flow in line 28. Other features of the operation are described below.

The tracking valve, described in more detail below, is the mechanism which proportions the water which flows through line 40 according to the amount of oil which flows through the lines 28, 32. The emulsifier may be of varying contruction, as are units in commerce. It has the combination function of injecting or mixing, and creating an emulsion of the mixture. An orfice and mixing nozzle are preferred, but agitated line mixers are usable as well. Of course in other applications than that described here, if the liquids being mixed are miscible the emulsifier may be replaced with a simple injector mixer.

In operation, the fuel oil will flow in sequence through the line 28, the tracking valve 30, the emulsifier 34, and the line 36. There are some small flow losses associated with the passage through these various elements, but in practice, the same fuel oil flow is obtained as exists in line 20 when the water injection system is bypassed. When a predetermined flow characteristic of normal operation of the combustor is detected in line 28, electric power from supply line 60 is allowed by the flow switch 58 to pass to the distribution lines 62, thereby energizing the pump 42, solenoid valve 46, and solenoid valve 56. Pressure switch 64 controls the flow of electric power to the pump 42; when there is inadequate water pressure in supply line 40 the switch 64 prevents operation of the pump, to protect it from damage. Energizing the pump and valve 46 allows high pressure water to flow by line 44 to the regulator 48. Energizing of valve 56 provides fuel oil pressure by line 54 to the differential pressure regulator. The differential pressure regulator, which is one of many commercial designs, provides a settable water pressure in line 38 which is a constant amount greater than the fuel oil pressure in line 54, which in turn is the same pressure as in line 32. Pump 42 is chosen to provide a pressure in line 44 which is higher than the pressure which is characteristically experienced in lines 20, 28, 32, 36. The water pressure in line 38 during operation is set to always be higher than the pressure of fuel oil in line 32 or the emulsifier 34.

The exact differential pressure must be set according to the desired percentage of water in oil. The desired percentage is a matter of choice, according to the particular situation, and may be determined from the indicated water flow rate shown by the flow meter 50 and the indicated oil flow rate, also determined from a flow meter, now shown, but of common design and installation. Obviously, other means may be used to determine the water percentage, such as by a water sensor in the oil-water stream entering the combustor. As will become apparent from the description of the construction and operation of the tracking valve, once the differential pressure is set, the percentage of water and oil will remain constant, even though the oil flow rate and pressure may both change. The tracking valve varies the water flow path area in response to the oil flow, according to a relationship set by its mechanical configuration. Since the differential pressure regulator provides a constant pressure to the tracking valve, the flow of water from the valve into the mixer will be constant for a certain flow of oil, even when the pressure in the oil line changes. In practice, the pressure and flow rate of the oil stream both vary with the operation of the combustor controls 57,55 which modulate the firing rate. Thus the apparatus will simultaneously adjust for both pressure and flow rate changes by concerted action of the differential pressure regulator and the tracking valve.

Certain aspects of the apparatus are most importantly not a matter of simple design choice, but are required for best operation of the system. Line 32 must be minimized in length, and in fact it is preferred that the water discharge port of the tracking valve be connected directly to the emulsifier inlet port. In such an instance a further port may be conveniently provided in the first chamber of the tracking valve for connection of the line 54. A check valve 66 is also optionally located in the line 40 to prevent reverse flow in the water lines. However, this valve must have low impedance so as to avoid the creation of undue pressure drop. With this requirement, it is typical that good sealing or checking cannot be obtained. Thus, check valve 52 is positioned in the high pressure line 44 which feeds the differential pressure regulator. The check valve 52 can be of a more positive sealing design, as higher impedance is acceptable in the line 44. The flow meter 50 is preferably a conventional rotameter type, although other types may be used. It is preferred that the flow meter be located as shown, upstream of the check valve 52, to ensure that oil which may foul it does not enter. Typically, the line 20 contains multiple pressure regulators and a modulating valve 55 which controls firing rate of the combustor. Preferably the invention connection lines 28, 36 will intercept line 20 just upstream of the last pressure regulator 57.

Referring now to FIGS. 2 and 3 the details of the tracking valve 30 will be described. The tracking valve is comprised of a multiplicity of circular segments 64, 66, 68, 70, which are clamped together by longitudinal bolts 74 and end plates 76. The body segments are sealed where they are tightly contacted by o-rings 72. The segmented design just described is preferred for ease of manufacturing and service but it will be evident that other constructions may be used to carry out the invention. Segments 68 and 70 define a first fluid chamber 78 through which the fuel oil flows, entering by port 80 to which line 28 is connected and exiting by port 82 to which line 32 is connected. A second fluid chamber 84 is adapted to receive the water which enters by port 86 to which line 38 is connected and exits by line 88 to which line 40 is connected.

Within the first fuel oil chamber 78 is a float 90, connected to a float extension 92. The float extension slides in body segment 68 and thereby guides the float motion, while spring 94 biases the float toward the entrance port 80. The chamber 78 has walls 96 tapered in the direction in which fuel flows. Thus movement of the float away from the entrance port will increase the annular area 97 through which fuel may flow. In operation, oil flowing from the entrance port 80 will force the float vertically upward against the biasing spring 94, thereby increasing the flow area and moving the float 90 along the axis of the float extension in proportion to the flow through the chamber.

The float extension 92 penetrates the first chamber into the second chamber 84 where the water is present. Within this chamber is a needle element and seat valving combination of particular design. The needle element 98 has a tapered end 102, the apex of which rests in a cavity 104 at the end of the float extension, with which it is co-aligned. The needle 98 is biased toward the float by spring 106 which presses on the needle shoulder 114. Inasmuch as water flows from port 86 to port 88 the direction of a water flow around the needle is in the same direction as the spring bias force. The water flow force is small in operation, but when the needle contacts the seat, there is a desirable tendency for the water pressure on the valve to cause sealing. Thus, the needle 98 is maintained in constant contact with the float extension and movement of the float extension will therefor cause like movement of the needle. Surrounding the needle is a seat 100. This seat is axially adjustable by means of a thread 108 when the pin 116 is used to rotate the seat. Thus adjustment may be made of the amount of water which will flow through the second chamber 84 for any given axial position of the needle. The o-rings 110 and 111 both provide a seal and resilient lock for the movable seat 100. The seat assembly has ports 112 which allow water introduced into the chamber 84 to flow first around the seat assembly, thence into its interior, about the needle contained therein, and thence through the annular orifice opening 115 provided between the needle and the seat. It is seen that the needle element 98 has at the end opposite the taper a larger diameter shoulder portion 114 which guides the needle within the seat. Thus the axial motion of the needle is guided by the shoulder 114 in contact with the seat, in combination with the tapered end 102 in contact with the cavity 104 at the end of the float extension. This guidance of the needle from widely spaced points obtains good alignment of the needle in the body and with respect to the seat, providing accuracy and reproducibility.

Accordingly, it should be seen that motion of the float 90 will be proportional to change in the annular flow area 97, which is dependent on fuel flow. The motion of the float will result in a corresponding change in the flow area 115 in the second chamber. It should be understood that by proper choice of the combination of tapers of the first chamber walls 96 and the taper of the needle 102 the proportions of the water flow area 115 with respect to oil flow area 97 can be predetermined. Another feature of the valve resides in the relationship between the float extension and the seat 100. Should the bias spring 94 fail in operation, excess percentages of water might be introduced, but for the feature illustrated in FIG. 3. It is seen that when the float moves greatly upward, the extension will contact the seat 100, thereby blocking the opening 115 and preventing further flow of water. Thus, the water flow is virtually shut off and the combustor will continue to fire. This is much preferred to the excess injection of water which would otherwise result.

There are some further details necessary to describe the best mode. The o-ring 118 prevents mixing of oil and water along the path of the float extension and its design is important. As designed the tracking valve is intended to be very sensitive to small changes in flow. It is also desirable that the biasing force provided by the springs 94 and 106 be kept to a minimum, to prevent undue pressure drop in the fuel oil by great resistance to movement of the float 90. (In fact the valve may be operated without the biasing springs, and with only the force of gravity if the valve is in the vertical position shown in FIG. 2, with of course different flow response from the same configuration with springs. But the use of springs or other biasing means is preferred to eliminate minor oscillations and overcome any slight sticking which may occur due to debris and the like, as well as to provide for operation in non-vertical positions.)

Referring to FIG. 3, shown is a design for the o-ring seal 118 which best carries out the invention. The outer diameter 120 of the groove is greater than the outer diameter of the o-ring, as opposed to the normal seal design in which the outer diameter would be smaller than the o-ring diameter. In addition the axial width "W" of the groove is made slightly greater than the width of the o-ring. Thus the o-ring may move axially against one axial sealing face or the other, according to the biasing liquid pressure. The differential pressure across the o-ring 118 is normally not great inasmuch as the water pressure is made a relatively small amount greater than the fuel oil pressure. However, under conditions of no water pressure there can be a substantial pressure differential.

As stated, the combination of the regulator and tracking valve provides the exact proportioning. FIG. 4 shows characteristic flow relationships for the invention. The slopes of lines P1, P2, P3 on the graph indicate the water-oil proportions which will be achieved with a particular valve under increasing differential pressures of water over fuel oil. The slope of the lines P1, P2, P3 on the Figure are determined by the related tapers of the water chamber walls and needle. If for example, the needle were made with a taper that was blunter (less acute angle), then the slope of the lines in the Figure would be increased. Consequently, the design of the valve and the use of the valve in combination with the regulator, provide complete choice over the proportioning of oil and water. Further, since the differential pressure regulator sets the water pressure according to the fuel line pressure, the water proportions will be exactly maintained regardless of fluctuations in fuel line or water line pressures.

The tracking valve and the entire apparatus are readily usable on systems where the pressures range from 2-200 psi (0.14-14 kPa) and the flow varies over a range of 10:1. At low flow rates, below those characteristic of the lowest firing rate of the combustor, the emulsifier may not function properly, particularly if it is of the orfice type. Therefore, the system is configured to prevent the introduction of water into the fuel oil under such conditions. A signal from switch 58 through lines 62, e.g., termination of electric supply, will prevent further water flow by closing the solenoid 46 and shutting down pump 42 at a predetermined flow rate just below the minimum firing rate flow. Typically, this flow rate might be 5-8 percent of the maximum for the combustor. In the invention this is accomplished by the operation of solenoid valve 46 which is normally closed at zero flow unless energized by a signal from flow switch 58. It is equally important that fuel oil not be introduced into the water processing parts of the apparatus, such as when there is a restriction in the source line or the pump fails. The check valve 52 (aided by the check valve 66 if used) will prevent the undesired flow of oil.

Other embodiments of the invention are within contemplation, including but not limited to: valve configurations which provide non-linear relationships between the flow path areas in the separate chambers; a seal on the float extension other than an o-ring, such as a bellows, which also provides the necessary low resistance to movement; other mechanical configurations for changing the flow path area in either chamber, such as a sliding perforated cage which progressively exposes more perforation area as it moves within the chamber, and other configurations known generally in flow meter technology.

While the invention has been described in the foregoing preferred embodiment and alternatives, it should not be so limited, as it is capable of many modifications and changes in construction are arrangement which may be made without departing from the spirit and scope of the invention.

I claim:

1. A valve for proportioning a second fluid stream to a first fluid stream, comprising a body having
   (a) a first fluid chamber, having inlet and outlet ports;
   (b) a movable float contained within the first chamber and defining therewith a first flow path area, the float and chamber shaped so that flow of fluid through the chamber can cause movement of the float along an axis of the float, the movement providing increased flow path area;
   (c) first biasing means located within the first chamber, for urging the float to a position which minimizes the first flow path area;
   (d) a second fluid chamber lying along the float axis, having inlet and outlet ports and containing a seat;
   (e) a float extension fixedly connected to the float and lying along the float axis, the extension extending into the second chamber to move an element therein;

(f) means for guiding the movement of the float extension along its axis, positioned between the first and second chambers;

(g) an element within the second chamber, in contact with the float extension, the element movable along the float axis to engage the seat therein, the element and the seat shaped to define a second flow path area, so that change in the second flow path area is in the same sense as change in the first flow path area, when the element is moved by the float extension;

(h) means for guiding the movement of the element, within the second chamber;

(i) second biasing means located within the second chamber, for urging the element to a position which minimizes the second flow path area;

(j) said body comprised of a plurality of body segments, including a first segment defining a portion of the first chamber, a second segment providing guide means for the float extension, a third segment defining a portion of the second chamber; and (k) means for holding the body segments axially in sealed contact.

2. A valve for proportioning a second fluid stream to a first fluid stream, comprising a body having (a) a first fluid chamber, having inlet and outlet ports;

(b) a movable float contained within the first chamber and defining therewith a first flow path area, the float and chamber shaped so that flow of fluid through the chamber can cause movement of the float along an axis of the float, the movement providing increased flow path area;

(c) first biasing means located within the first chamber, for urging the float to a position which minimizes the first flow path area;

(d) a second fluid chamber lying along the float axis, having inlet and outlet ports and containing a seat;

(e) a circular rod shaped float extension fixedly connected to the float and lying along the float axis, the extension extending into the second chamber to move an element therein;

(f) means for guiding the movement of the float extension along its axis, positioned between the first and second chambers;

(g) a seal around the float extension, positioned within said guiding means between the first and second chambers, the seal comprising an O-ring within a cavity in the guiding means surrounding the float extension, the cavity having a diameter larger than the diameter of the O-ring and a length along the axis of the float extension which is greater than the thickness of the O-ring, to allow axial movement of the float extension with minimum resistance;

(h) an element within the second chamber, in contact with the float extension, the element movable along the float axis to engage the seat therein, the element and the seat shaped to define a second flow path area, so that change in the second flow path area is in the same sense as change in the first flow path area, when the element is moved by the float extension;

(i) means for guiding the movement of the element, within the second chamber; and (j) second biasing means located within the second chamber, for urging the element to a position which minimizes the second flow path area.

3. The device of claims 1 or 2, characterized by the second fluid chamber having inlet and outlet ports positioned to produce fluid flow in a direction which urges the element in the same direction as the second biasing means urges the element.

4. The valve of claims 1 or 2 wherein the second chamber element seat is axially moveable to permit adjustment of the second fluid flow path area for a particular float position.

5. The valve of claims 1 or 2 wherein the float extension and seat are shaped so the float extension engages the seat and blocks flow through the second chamber when the float moves to a position which provides a predetermined maximum flow path area in the first chamber.

6. The valve of claims 1 or 2 wherein the element is a needle, and wherein the means for guiding the movement of the needle are comprised of a surface within the second fluid chamber in sliding engagement with a portion of the needle and a cavity in the end of the float extension, the tapered end of the needle in contact with the float extension cavity.

7. Apparatus for mixing a constant proportion of water into an oil stream within a line, wherein the oil stream varies in flow rate and pressure comprising (a) a supply of water at a pressure greater than the pressure of oil in the line;

(b) a differential pressure regulator connected to the supply of water and the oil line, to modulate the water pressure and discharge water at a pressure which is a constant amount greater than the pressure of the oil in the line just before the point at which the oil and water are mixed;

(c) a valve having a first chamber connected to the oil stream line and a second chamber connected to the water discharge of the regulator, moveable members within the valve providing a water flow path area which varies according to the oil flow path area, the valve having points for discharging predetermined proportions of water and oil separately;

(d) an emulsifying mixer connected in the oil line and water line downstream from the valve discharge points, for combining and dispersing the water within the oil;

(e) means for preventing flow of oil into the water conveying parts of the apparatus, to prevent fouling of the valve and other components when the water pressure in portions of the apparatus is less than the oil stream pressure; and (f) means for isolating the differential pressure regulator from the water supply and the oil line, to prevent damage to the regulator when low oil flow or low water pressure is encountered.

8. The apparatus of claim 7 further comprising means for producing a signal in response to flow in the oil line, said signal activating the isolating means, to enable the prevention of water flow to the valve and mixer when low flow is encountered.

* * * * *